(12) United States Patent
Ramech et al.

(10) Patent No.: US 7,225,382 B2
(45) Date of Patent: May 29, 2007

(54) INCREMENTAL REDUNDANCY OPERATION IN A WIRELESS COMMUNICATION NETWORK

(75) Inventors: Rajaram Ramech, Cary, NC (US); Jacob Singvall, Lund (SE); Johan Axnäs, Solna (SE); Tomas Jönssonl, Luleå (SE)

(73) Assignee: Telefonakiebolaget LM Ericsson (publ), Stockholm (SE)

( * ) Notice: Subject to any disclaimer, the term of this patent is extended or adjusted under 35 U.S.C. 154(b) by 448 days.

(21) Appl. No.: 10/837,753

(22) Filed: May 4, 2004

(65) Prior Publication Data
US 2005/0251721 A1    Nov. 10, 2005

(51) Int. Cl.
*H04L 1/18*    (2006.01)
*G08C 25/02*    (2006.01)
(52) U.S. Cl. ...................................... 714/748
(58) Field of Classification Search ................. 714/748
See application file for complete search history.

(56) References Cited

U.S. PATENT DOCUMENTS

| 6,671,849 B2 | 12/2003 | Tripathi et al. ............. 714/746 |
| 7,126,928 B2 * | 10/2006 | Tiedemann et al. ......... 370/329 |
| 2001/0056560 A1 | 12/2001 | Khan et al. ................. 714/746 |

FOREIGN PATENT DOCUMENTS

| GB | 2393086 | 3/2004 |
| WO | 02/23792 | 3/2002 |

OTHER PUBLICATIONS

Sesia et al. THe throughput of an LDPC-based incremental-redundancy scheme over block-fading channels, Oct. 2002, IEEE, p. 15-18.*
TSGR1#18(01)0124 Text Proposal for the TR 25.848 Lucent Technologies; Jan. 15-19, 2001.
TSGR1#17(00)1382, Asynchronous and Adaptive Incremental Redundancy ($A^2IR$) Proposal for HSDPA, Lucent Technologies, Nov. 21-24, 2000.

(Continued)

*Primary Examiner*—Shelly Chase
(74) *Attorney, Agent, or Firm*—Nixon & Vanderhye P.C.

(57) ABSTRACT

The invention relates to incremental redundancy operation, and a basic idea of the invention is to provide an extended acknowledgment feedback, for each of a number of data blocks, from the receiving side to the transmitting side to enable indication whether any soft information associated with at least one sub-block of the data block has been stored in memory at the receiving side. This information helps the transmitter to select which of the data blocks that may be suitable to retransmit next. For example, by first retransmitting data blocks for which one or more sub-blocks are already stored in the receiver memory, the probability of successful decoding of these data blocks increases, and thus the corresponding sub-blocks can be removed from memory, allowing room for sub-blocks of new data blocks. This significantly improves the utilization of the memory on the receiving side, increases throughput and reduces delay.

38 Claims, 7 Drawing Sheets

OTHER PUBLICATIONS

RLC/MAC Simulation for GPRS and EDGE, P. Schefczik, Global Wireless System Research, Feb. 19, 1999.

Patent Application of Axnäs et al.; "Improved Incremental Redundancy Operation in a Wireless Communication Network;" U.S. Appl. No. 10/837,754; filed May 4, 2004.

Y. Kim and S. Bahk; "An Adaptive Hybrid ARQ Scheme Using Shortened Codes;" Global Telecommunications Conference, 1996; The Key to Global Prosperity London, UK Nov. 18-22, 1996; New York, NY, USA, IEEE, vol. 3, Nov. 18, 1996; pp. 2157-2161.

International Search Report and Written Opinion mailed Jun. 28, 2005 in corresponding PCT Application PCT/EP2005/051085.

International Search Report and Written Opinion mailed Jun. 29, 2005 in corresponding PCT Application PCT/EP2005/051094.

* cited by examiner

INCREMENTAL REDUNDANCY OPERATION IN A WIRELESS COMMUNICATION NETWORK

TECHNICAL FIELD OF THE INVENTION

The present invention generally relates to wireless communications and in particular to the use of incremental redundancy schemes in wireless networks such as radio communication networks.

BACKGROUND OF THE INVENTION

There is a continuously growing demand for improved throughput in wireless communication networks. Incremental redundancy, which is sometimes referred to as Hybrid ARQ (Automatic Repeat reQuest), is an advanced technique for improving the throughput performance of a wireless link, and particularly interesting for packet-oriented high-speed wireless communications.

Figure 1:
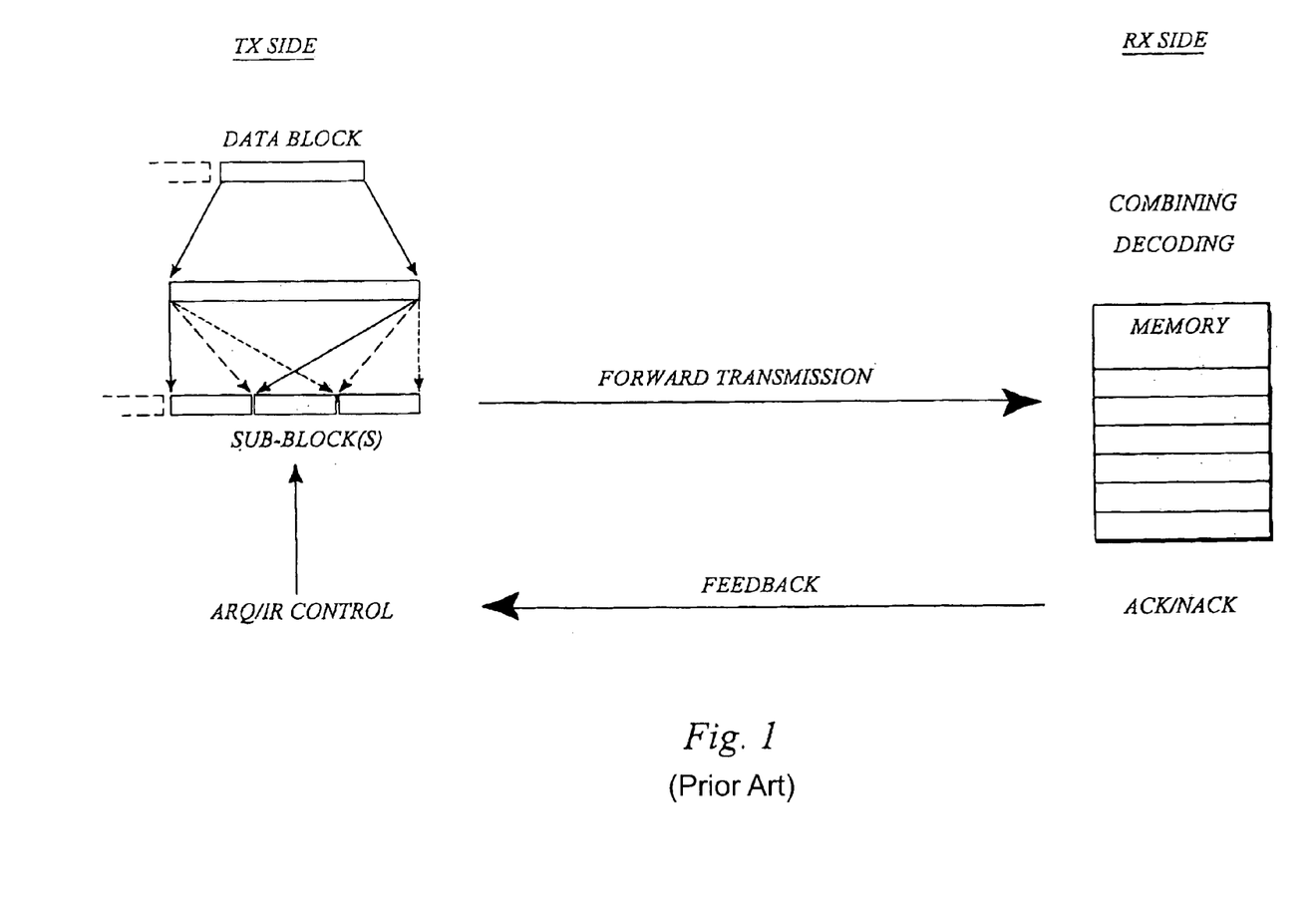
FIG. 1 is a schematic overview of basic incremental redundancy scheme according to the prior art.

In the basic incremental redundancy scheme, each data block is encoded with redundancy and punctured into a number of versions, often referred to as sub-blocks, of the encoded data block for transmission from the transmitting side to the receiving side, as schematically illustrated in FIG. 1. The sub-blocks can be produced all at once and stored for use as and when required by the ARQ scheme, or alternatively each particular version or sub-block is produced dynamically upon request. The sub-blocks are transmitted over the air interface. If the receiving side can not decode the data block correctly based on the first received sub-block a Negative Acknowledgement (NACK) is sent to the transmitting side. If possible, soft values of the first sub-block may be stored in memory at the receiving side. In response to the NACK, the next sub-block will be sent. The receiving side utilizes stored soft values of the first sub-block and combines them with the soft values of the presently received sub-block to increase the chances of successful decoding. This procedure continues until the data block is correctly decoded, or all sub-blocks have been transmitted. If the combination of all sub-blocks still can not be decoded, the sub-blocks will be transmitted from the beginning once again until the data block is successfully decoded. The sub-blocks are thus transmitted incrementally to gradually increase the rate of redundancy in the received signal information. When a data block is successfully decoded, the receiving side transmits a positive acknowledgement (ACK) to the transmitting side. The ACK/NACK feedback simply indicates whether or not the data block has been received and decoded correctly.

Normally, the receiving side must know the sequence numbers before combining separate sub-block transmissions. Each transmitted sub-block is therefore typically identified by a sequence number and preferably also a sub-block number, both of which are contained in a header that is normally coded separately from the data. If a header error should occur, then the corresponding sub-block will be lost.

In short, the incremental redundancy soft combining generally leads to a higher probability of correct decoding. However, at the same time the conventional incremental redundancy schemes put high requirements on the memory size on the receiving side, since the receiving side needs to store soft samples for each partially received data block. This means that the memory requirements may be huge. When the receiver, such as a mobile terminal, only has a finite amount of memory for this purpose, it may only store soft values corresponding to a few data blocks. This means that it is quite likely that the sub-blocks transmitted by the transmitter have no corresponding soft values in the receiver's memory, and thus can not be combined. Hence, the probability of correct decoding is lowered, and the throughput is reduced accordingly. In fact, this situation may take away all the advantages of using incremental redundancy. In addition, if the receiver memory is full, then the soft values corresponding to new data blocks can not be stored, which also leads to a reduction in throughput.

Hence, there is a need for an improved incremental redundancy scheme for wireless communications.

RELATED ART

Reference [1] relates to a stop-and-wait hybrid ARQ scheme with incremental data packet combining, and suggests the use of three signaling commands: ACK, NACK and LOST. The suggested stop-and-wait ARQ scheme is used for data packet transmissions where a data packet may include a first type of bits and a second type of bits, the first type of bits being more important than the second type of bits, and where a negatively acknowledged packet triggers retransmission of the second less important type of bits. When absence of a data packet is detected, a LOST signal is sent to the transmitter rather than a NACK, and the transmitter initiates a first retransmission of the first more important types of bits of the data packet in response to the LOST signal.

References [2, 3] are working documents relating to hybrid ARQ incremental redundancy schemes for HSDPA (High Speed Downlink Packet Access).

Reference [4] relates to RLC/MAC simulation for GPRS and EDGE and schematically describes incremental redundancy with examples of coding and puncturing for various modulation and coding schemes.

SUMMARY OF THE INVENTION

It is a general object of the present invention to improve the throughput performance and/or reduce delay in wireless communication networks. In particular, it is desirable to provide an improved scheme for incremental redundancy operation for wireless communications.

It is also a general object to improve the utilization of the memory on the receiving side.

It is an object of the invention to increase the probability of successful decoding in incremental redundancy schemes with a limited amount of memory on the receiving side.

Another object of the invention is to provide additional enhancements that optimize throughput performance and reduce delay.

Yet another object is to provide a method and system for improved incremental redundancy operation in a wireless communication network.

It is also an object to provide a receiving node as well as a transmitting node supporting the improved incremental redundancy scheme.

These and other objects are met by the invention as defined by the accompanying patent claims.

A basic idea according to the invention is to provide an extended acknowledgement feedback, for each of a number of data blocks, from the receiving side to the transmitting side to enable indication of the situation in the receiver memory with regard to the data block. This generally means that the extended acknowledgement feedback may provide an indication whether any soft information (sub-block) of the data block has been stored in memory at the receiving side. This information helps the transmitter to select which of the data blocks that may be suitable to retransmit next.

For example, by first retransmitting data blocks for which one or more sub-blocks are already stored in the receiver memory, the probability of successful decoding of these data blocks increases, and thus the corresponding sub-blocks can be removed from memory, allowing room for sub-blocks of new data blocks. This significantly improves the utilization of the memory on the receiving side, increases throughput and reduces delay.

In general, the extended acknowledgement feedback enables indication that information associated with at least one sub-block of the data block has been stored in memory at the receiving side, Preferably, the extended acknowledgement feedback is adapted for transfer of information, for each of a number of data blocks, representative of how many sub-blocks of the data block that have been successfully represented in the receiver memory and/or information representative of the level of reliability, also referred to as the level of soft energy, of the sub-block information stored in the receiver memory. The former alternative may actually be a sub-set of the latter alternative, which in a sense is more general. This enables the transmitter to prioritize those data blocks that have higher level of reliability.

It may be beneficial to know not only how many sub-blocks that have been represented in memory, but also the level of soft energy (reliability) of the stored information (typically cach sub-block). This suggests that a hybrid combination of indicating the number of represented sub-blocks and indicating the level of soft energy may be useful. For example, it may be useful to select a data block for which two sub-blocks of relatively high levels of soft energy are stored in memory rather than a data block for which two sub-blocks of relatively low soft energy are stored in memory. Depending on how many levels of soft energy that can be represented in the extended acknowledgement feedback, it may even be possible to select a data block for which only a single sub-block has been stored rather than a data block for which two or more data blocks have been stored if the "total level of soft energy" is higher for the single sub-block than for the sum of the two sub-blocks.

Anyway, instead of transmitting a single ACK/NACK bit indicating whether a data block has been decoded or not, the invention proposes an extended acknowledgement feedback that helps the transmitting side prioritize among the data blocks to determine which of the data blocks to retransmit.

The extended acknowledgement feedback is preferably implemented by transmitting, for each of a number of data blocks, an extended acknowledgment feedback message comprising at least two bits representing the status of the data block at the receiving side. The extended acknowledgement message typically has a number of unique potential bit patterns or states for allowing indication not only whether the whole data block has been correctly decoded, but also for allowing indication that at least one sub-block has been received and stored in memory.

As a further optional enhancement, it is possible to provide an extended acknowledgement feedback that also enables indication of which of the multiple sub-blocks of a data block to set forth for transmission next. In a preferred embodiment, the receiving side then selects, for a given data block, a sub-block desired for transmission from the transmitting side and transmits an extended acknowledgement feedback message indicating that the receiving side wants the selected sub-block of the data block to be transmitted. The transmitting side transmits the selected sub-block to the receiving side in response to the extended acknowledgment feedback message when the corresponding data block is selected for retransmission.

For example, the selection of sub-block may be performed among those sub-blocks for which no soft information has been stored in the receiver memory to increase the likelihood of successful decoding of the corresponding data block. It is typically better to receive usable soft information from another sub-block not in the receiver memory rather than adding more soft energy to a packet already stored in memory.

Alternatively or as a complement, the sub-block selection may be based on sub-block reception quality. For example, when all sub-blocks of a data block have been received but the data block can still not be successfully decoded, it may be useful to determine which of the sub-blocks to retransmit based on the reception quality of the sub-blocks.

Typically, it would be best to retransmit the sub-block that has the lowest quality, i.e. the lowest level of soft energy in the receiver memory.

In a particularly advantageous embodiment of the invention, the extended acknowledgement feedback is implemented as an extended acknowledgement message that enables indication that at least one sub-block has been stored in memory and at the same time allows indication of which sub-block of a given data block to set forth for retransmission next by means of a minimal number of bits.

In a further aspect of the invention, multiple extended acknowledgement feedback messages are aggregated in a single aggregated acknowledgement message or bitmap. This actually means that the receiving side transmits to the transmitting side an aggregated acknowledgment message for multiple data blocks at a time to enable indication, for each data block, which sub-block of the data block to set forth for transmission to the receiving side. In particular, this opens up for more efficient use of incremental redundancy based on selective repeat ARQ. Preferably, bitmap compression may be applied to the aggregated acknowledgement bitmap to reduce the number of bits that have to be sent back to the transmitting side.

The invention offers the following advantages:

Increased probability of successful decoding;

Improved utilization of the memory;

Reduced number of retransmissions;

Increased throughput; and

Reduced delay.

Other advantages offered by the present invention will be appreciated upon reading of the below description of the embodiments of the invention.

BRIEF DESCRIPTION OF THE DRAWINGS

The invention, together with further objects and advantages thereof, will be best understood by reference to the following description taken together with the accompanying drawings, in which.

DETAILED DESCRIPTION OF EMBODIMENTS OF THE INVENTION

Throughout the drawings, the same reference characters will be used for corresponding or similar elements.

As previously mentioned, in most traditional incremental redundancy ARQ schemes, each of a number of data blocks is normally encoded with redundancy and then punctured into one or more reduced versions, generally referred to as sub-blocks, of the encoded data block, for transmission from the transmitting side to the receiving side. However, instead of transmitting a single ACK/NACK bit indicating whether a data block has been decoded or not, the invention proposes an extended acknowledgement feedback that helps the transmitting side prioritize among the data blocks to determine which of the data blocks to retransmit.

For a better understanding, the invention will now be described by way of example with reference to the flow diagrams of FIGS. 2A–B.

Figure 2A:
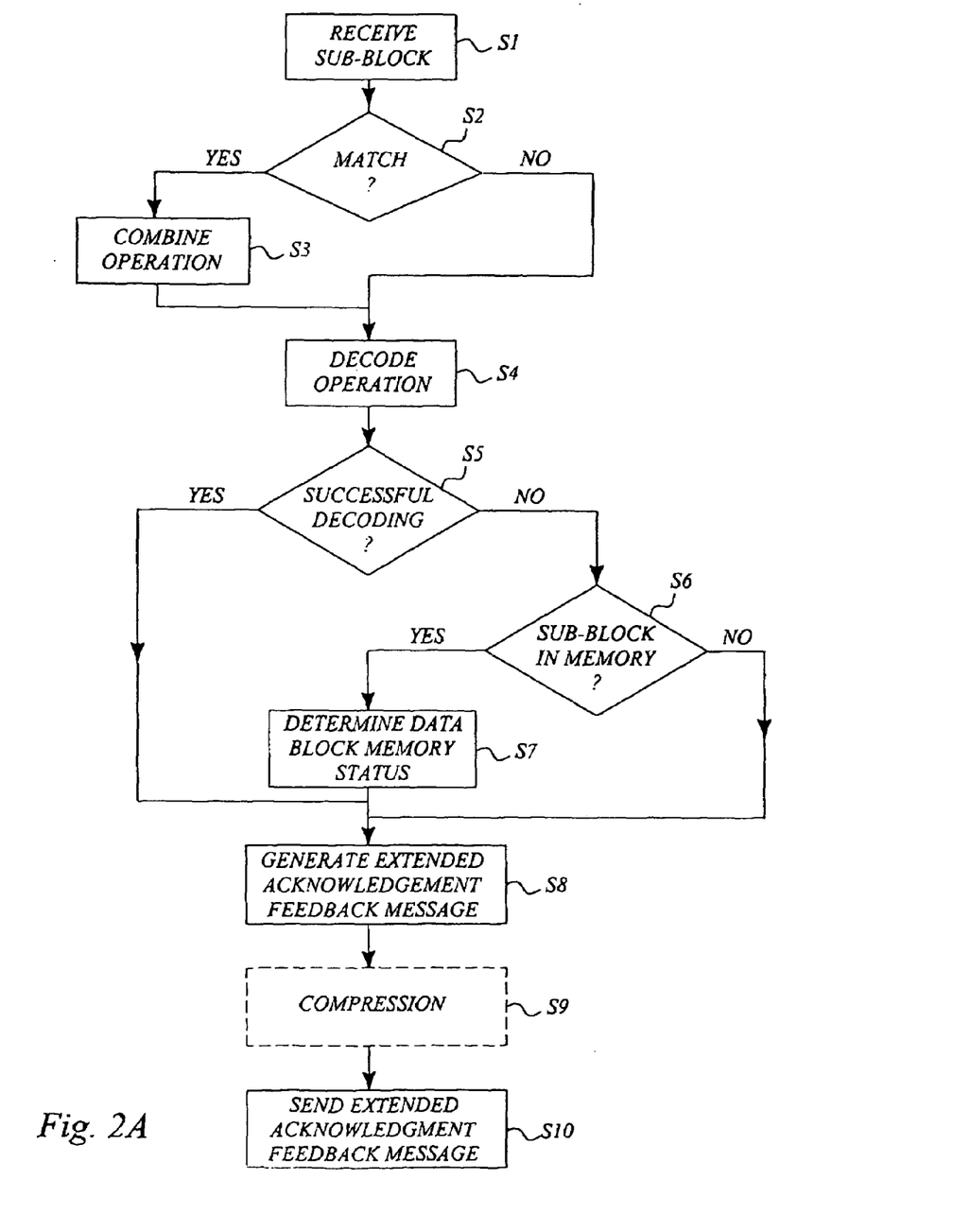
FIG. 2A is a schematic flow diagram illustrating a method for incremental redundancy operation on the receiving side according to a preferred exemplary embodiment of the invention.

FIG. 2A illustrates incremental redundancy operation on the receiving side according to a preferred exemplary embodiment of the invention.

In step S1, a sub-block is received. In step S2, it is then investigated whether the sub-block belongs to a new data block for which no soft information is stored in the receiver memory. This is normally performed by processing the header information associated with the encoded sub-block to find the corresponding sequence number and sub-block number. This information is then compared to the sequence numbers associated with the soft information stored in the receiver memory. If a match is found (YES), the receiver utilizes already stored soft values and combines them with the soft values of the presently received sub-block in step S3 to increase the chances of successful decoding. In step S4, the decode operation is performed. If the received sub-block belongs to a new data block, and there is no match (NO) with any sequence number in the receiver memory, the decode operation is performed directly without any soft combining.

In step S5, it is investigated whether the decoding was successful or not. If the receiving side could not decode the data block correctly based on the available sub-block information (NO), the currently received sub-block and/or the combined soft information is stored if possible and appropriate. In step S6, it is investigated whether soft information associated with one or more sub-blocks of the data block has actually been stored in the receiver memory. If no information is stored in memory (NO), this is noted and an appropriate acknowledgement feedback message will subsequently be generated. If, on the other hand, soft information associated with at least one sub-block is stored in the receiver memory (YES), the memory status of the data block may be determined in more detail if desired in step S7. This may for example involve determining how many sub-blocks of the data block that are represented in the receiver memory and/or determining the level of reliability of the stored sub-block information. If it is clear in step S5, that the decoding was successful, this is noted and an appropriate acknowledgement feedback message will be generated.

In step S8, depending on the decoding and/or the memory situation an appropriate extended acknowledgement feedback message is generated for the data block in question. In addition to the possibility to indicate whether the decoding was successful or not, the extended acknowledgement feedback proposed by the invention also enables indication that information associated with at least one sub-block of the data block is successfully stored in the receiver memory.

Optionally, multiple extended acknowledgement feedback messages can be aggregated into an aggregated acknowledgement bitmap and bitmap compression can be applied, as indicated in step S9. In step S10, the extended acknowledgement feedback message for the considered data block is transmitted to the transmitting side, either separately or together with other extended feedback messages, in compressed form or not. The steps S1–S10 are normally repeated for each of a number of received sub-blocks.

This extended acknowledgement feedback information, collected for a number of data blocks, helps the transmitting side to select which data block or blocks to retransmit to the receiver.

Figure 2B:
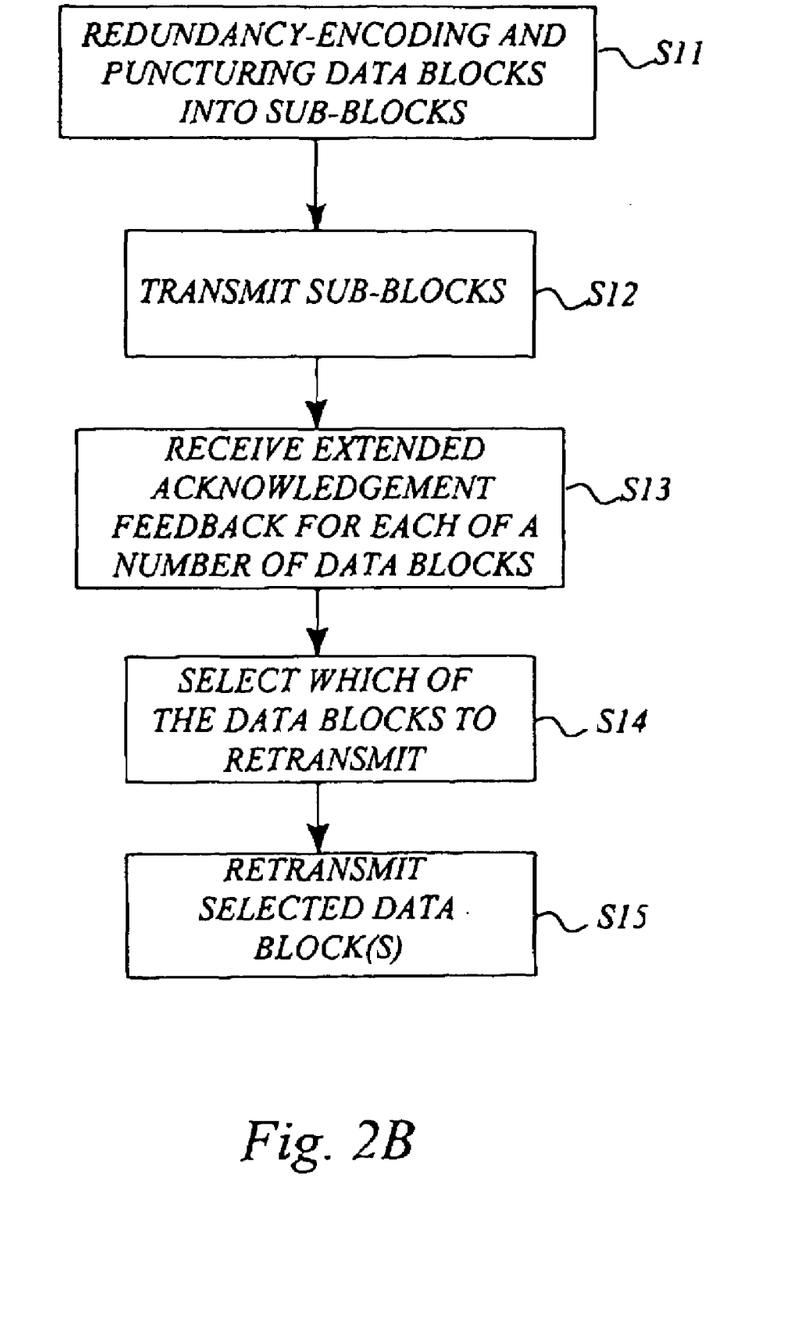
FIG. 2B is a schematic flow diagram illustrating a method for incremental redundancy operation on the transmitting side according to a preferred exemplary embodiment of the invention.

FIG. 2B illustrates incremental redundancy operation on the transmitting side according to a preferred exemplary embodiment of the invention.

In step S11, a number of data blocks are redundancy-encoded and punctured or otherwise reduced into encoded sub-blocks on the transmitting side. In step S12, the encoded sub-blocks are transmitted to the receiving side. Subsequently, in step S13, the transmitter receives extended acknowledgement feedback for each of a number of data blocks. In step S14, the transmitter then selects at least one data block for retransmission based on the extended acknowledgement feedback information. The selected data block or blocks are then retransmitted in step S15.

For example, retransmitting data blocks for which one or more sub-blocks are already stored in the receiver memory means that the probability of successful decoding of these data blocks increases, and thus the corresponding sub-block information can be removed from memory, allowing room for soft information associated with new data blocks. This significantly improves the utilization of the memory on the receiving side, increases throughput and reduces delay.

Figure 3:
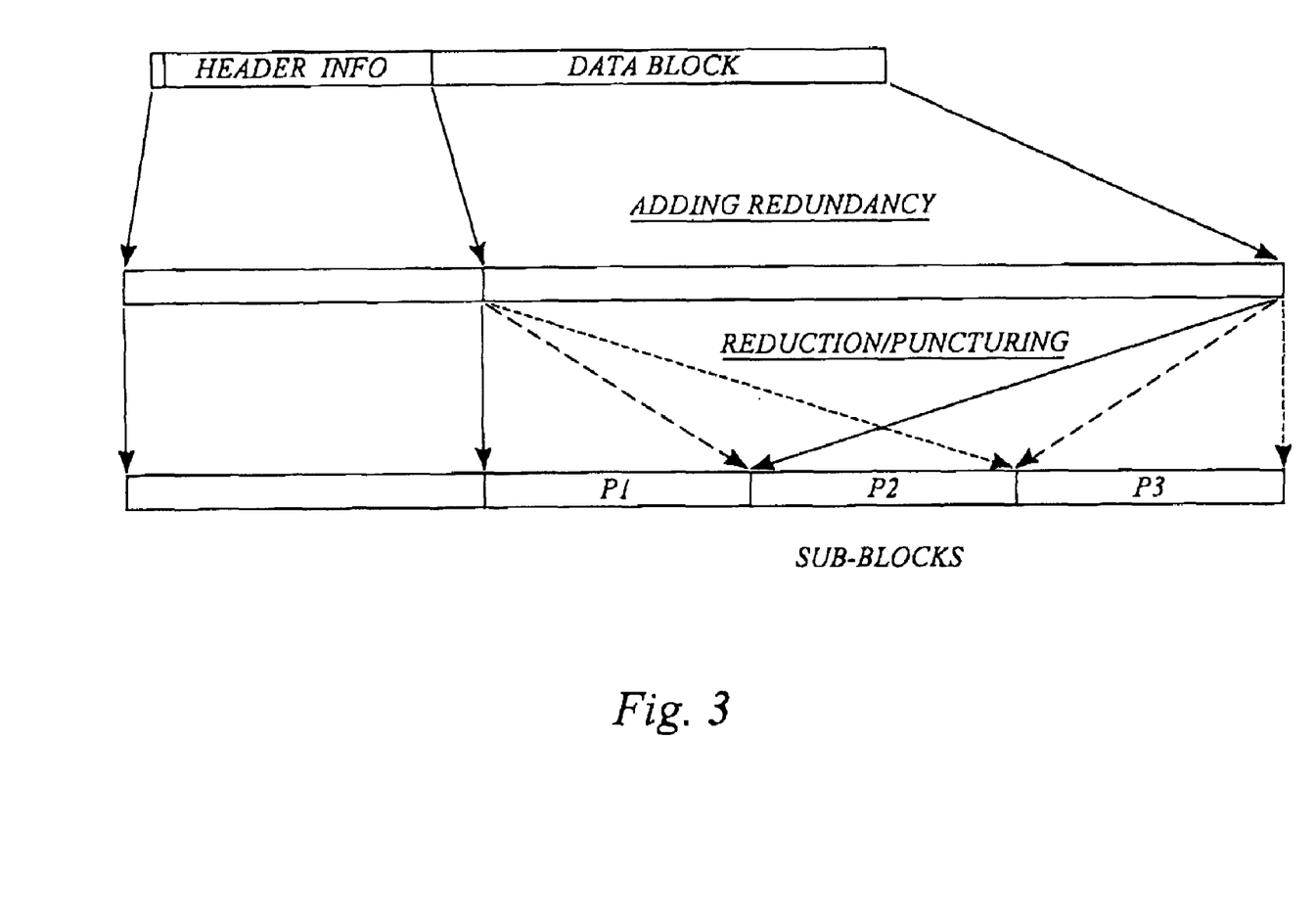
FIG. 3 is a schematic diagram illustrating an example of redundancy encoding and reduction/puncturing according to an exemplary embodiment of the invention.

FIG. 3 schematically illustrates an example of redundancy encoding and puncturing according to an exemplary embodiment of the invention. For example, a normal RLC/MAC (Radio Link Control /Medium Access Control) block includes header information and payload data. For error detection and/or correction purposes, additional redundant information is added to the header and data parts, e.g. by convolutional encoding or any other suitable redundancy-encoding scheme. The coded information is then normally punctured or otherwise reduced to form smaller entities of data, called sub-blocks or versions, that can be transmitted incrementally to gradually increase the rate of redundancy in the received data. This generally corresponds to Hybrid-ARQ-II. The sub-blocks can be produced all at the same time and stored for use as and when required by the ARQ scheme, or alternatively each particular version or sub-block is produced dynamically upon request. Both overlapping sub-blocks and non-overlapping sub-blocks may be produced. In this particular example, three different sub-blocks or versions P1, P2 and P3 can be produced.

Normally, the receiving side must know the sequence numbers before combining separate sub-block transmissions. Each transmitted sub-block is therefore typically identified by a sequence number and preferably also a sub-block number, both of which are contained in the header that is normally coded separately from the data. If a header error should occur, then the corresponding sub-block will be lost.

Hybrid-ARQ-III also belongs to the class of incremental redundancy schemes. However, with H-ARQ-III, each retransmission is self-decodable. Chase combining, which is also referred to as H-ARQ-III with one redundancy version, involves retransmission of the same coded data packet. The receiver combines multiple copies of the transmitted packet weighted by the received SNR to obtain a diversity gain. In H-ARQ-III with multiple redundancy version, different puncture bits are typically used in each retransmission.

As previously mentioned, the extended acknowledgement feedback enables indication that information associated with at least one sub-block of the data block has been stored in memory at the receiving side. Preferably, the extended acknowledgement feedback is adapted for transfer of information, for each of a number of data blocks, representative of how many sub-blocks of the data block that have been successfully represented in the receiver memory and/or information representative of the level of reliability, also referred to as the level of soft energy, of the sub-block information stored in the receiver memory.

In the following, the invention will be described with reference to different exemplary implementations of an extended acknowledgement feedback especially adapted for IR schemes with three puncturing patterns/sub-blocks. The invention is however not limited to the use of three puncturing patterns, as readily understood by the skilled person.

The extended acknowledgement feedback is preferably implemented by transmitting, for each of a number of data blocks, an extended acknowledgment feedback message comprising two (or more) bits representing the status of the data block at the receiving side. The extended acknowledgement message typically has a number of unique potential bit patterns for allowing indication not only whether the whole data block has been correctly decoded, but also for allowing indication that at least one sub-block has been received and stored in memory. If no more than three puncturing patterns are used, then two bits may be sufficient as will be exemplified below. If more than three puncturing patterns are used, then it may be necessary/useful to employ more than two bits for reporting the status of each data block.

In a first example, two bits are used for reporting the status of each data block, and more specifically to enable indication of how many sub-blocks that are represented in the receiver memory:

00—The data block has been received and decoded correctly.
01—The data block has not been received and no soft information has been stored. This would normally mean that not even the header was received, or that the header was received but the receiver was out of IR memory so that the soft information could not be stored.
10—The header was received, and information associated with one sub-block stored.
11—The header was received, and information associated with two sub-blocks stored.

On the transmitting side, it may thus be beneficial to select data blocks that already have one or preferably two sub-blocks stored in the receiver's memory. By retransmitting such data blocks, the soft combining feature of the IR schemes increases the probability of successful decoding.

In an alternative and somewhat more general example, two bits are used for reporting the status of each data block, and more specifically to enable indication of the level of soft energy of the information stored in the receiver memory:
00—The data block has been received and decoded correctly.
01—The data block has not been received and no soft information has been stored.
10—The header was received, and low level of soft energy stored in memory.
11—The header was received, and high level of soft energy stored in memory.

It is naturally desirable to select those data blocks for retransmission that have relatively high levels of soft energy in the receiver's IR memory. If only low levels of soft energy are stored in the receiver memory, it is of course better to select data blocks with low levels of energy rather than data blocks with no soft energy at all in the receiver memory. The level of soft energy is normally determined in connection with the demodulation and/or decoding, using any known metric to estimate how far the received bit sequence is from a correct word. Other ways of estimating the level of reliability are also possible, including bit error rate estimation and measuring signal-to-noise ratio (SNR), signal-to-interference-ratio (SIR), block error probability (BLEP) or any combination thereof.

If appropriate, further levels may be implemented, employing more than two bits to enable representation of the different levels.

It may even be beneficial to indicate, in a hybrid combination of the two previous examples, not only how many sub-blocks that have been represented in memory, but also the level of soft energy (reliability) of the stored information. By way of example, this could be implemented by using three bits to report the status of each data block:
000—The data block has been received and decoded correctly.
001—The data block has not been received and no soft information has been stored.
010—Information associated with one sub-block stored with low level of soft energy—a situation denoted (1; Low).
011—Information associated with one sub-block stored with high level of soft energy—a situation denoted (1; High).
100—Information associated with two sub-blocks stored, both with low level of soft energy—a situation denoted (2; Low/Low).
101—Information associated with two sub-blocks stored, one with low level of soft energy and one with high level of energy—a situation denoted (2; Low/High).
110—Information associated with two sub-blocks stored, both with high level of soft energy—a situation denoted (2; High/High).

For example, it may be useful to select a data block for which two sub-blocks of relatively high levels of soft energy are stored in memory rather than a data block for which two sub-blocks of relatively low soft energy are stored in memory. Depending on how many levels of soft energy that are represented in the extended acknowledgement feedback, it may even be possible to select a data block for which only a single sub-block has been stored rather than a data block for which two or more data blocks have been stored if the "total level of soft energy" is higher for the single sub-block than for the sum of the two sub-blocks. This can for example be evaluated by means of a weighted comparison. In a sense, each weighted measure in such a comparison is representative of the total level of soft energy for a specific data block.

Figure 4:
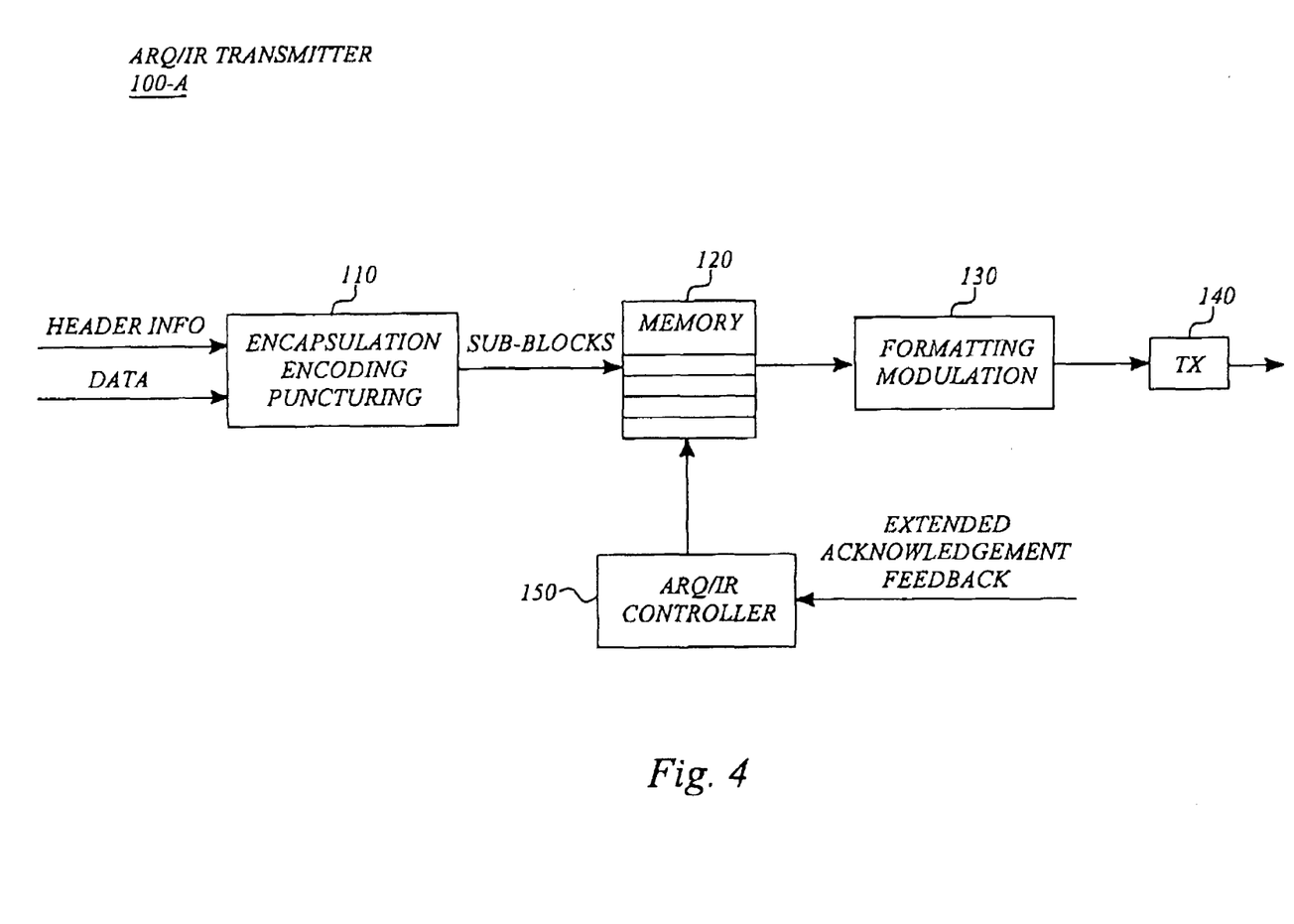
FIG. 4 is a schematic block diagram of an ARQ/IR transmitter according to an exemplary embodiment of the invention.

FIG. 4 is a schematic block diagram of an ARQ/IR transmitter according to an exemplary embodiment of the invention. The ARQ/IR transmitter 100-A basically comprises an encapsulation, encoding and puncturing module 110, a memory buffer 120 for sub-blocks, a formatting and modulation module 130, a transmission module 140 and an ARQ/IR controller 150. In response to header information and payload data, module 110 takes care of encapsulation, encodes data and header with additional redundant information, and punctures or otherwise reduces the encoded information into sub-blocks. For example, data may be encoded by a rate ⅓ convolutional code. For any incremental redundancy based ARQ, it is important to have well-protected header information. Therefore the header information is usually coded using a stronger code and is also normally protected with its own CRC. The encoded sub-blocks together with relevant header information are then stored in the memory buffer 120, awaiting transmission under the control of the ARQ/IR controller 150. As explained above, the ARQ/IR controller operates based on extended acknowledgement feedback for a number of previously transmitted data blocks to select a suitable data block for transmission. Once the ARQ/IR controller has decided that an encoded version or sub-block of a selected packet data unit or data block is to be transmitted, the encoded sub-block of the data block is picked out from the memory buffer 120 and transferred to the formatting and modulation module 130. Finally, the encoded and modulated sub-block is forwarded to the transmission module 140 for transmission to a receiving node such as a mobile terminal.

Figure 5:
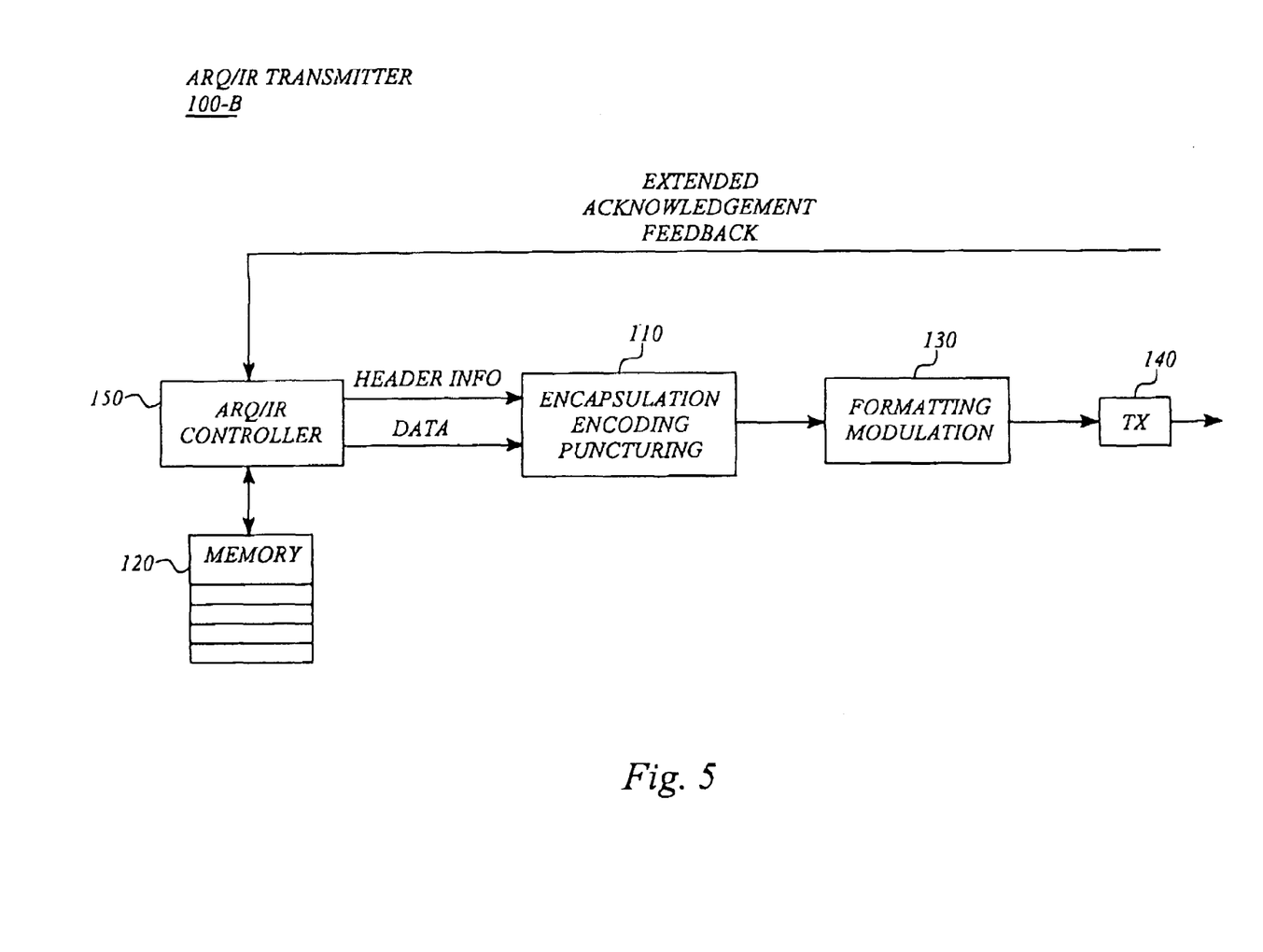
FIG. 5 is a schematic block diagram of an ARQ/IR transmitter according to an alternative embodiment of the invention.

FIG. 5 is a schematic block diagram of an ARQ/IR transmitter according to an alternative embodiment of the invention. The ARQ/IR transmitter 100-B has the same or similar components as the ARQ/IR transmitter of FIG. 4, but rather than storing multiple versions or sub-blocks of a data block, the transmitter of FIG. 5 dynamically selects which sub-block to produce and prepare for transmission. This has the advantage of reducing the memory requirements of the transmitter. As previously described, the ARQ/IR controller 150 operates based on extended acknowledgement feedback for multiple data blocks to select data blocks for retransmission. However, in the implementation of FIG. 5, the ARQ/IR controller 150 controls, for each selected data block, transfer of header information and data from the memory buffer 120 to module 110, and also commands the encoding and puncturing module 110 to use a selected puncturing scheme, thus producing a particular encoded version or sub-block of the data block. The produced sub-block is then transferred to the formatting and modulation module 130, and finally the encoded and modulated sub-block is forwarded to the transmission module 140 for transmission.

Figure 6:
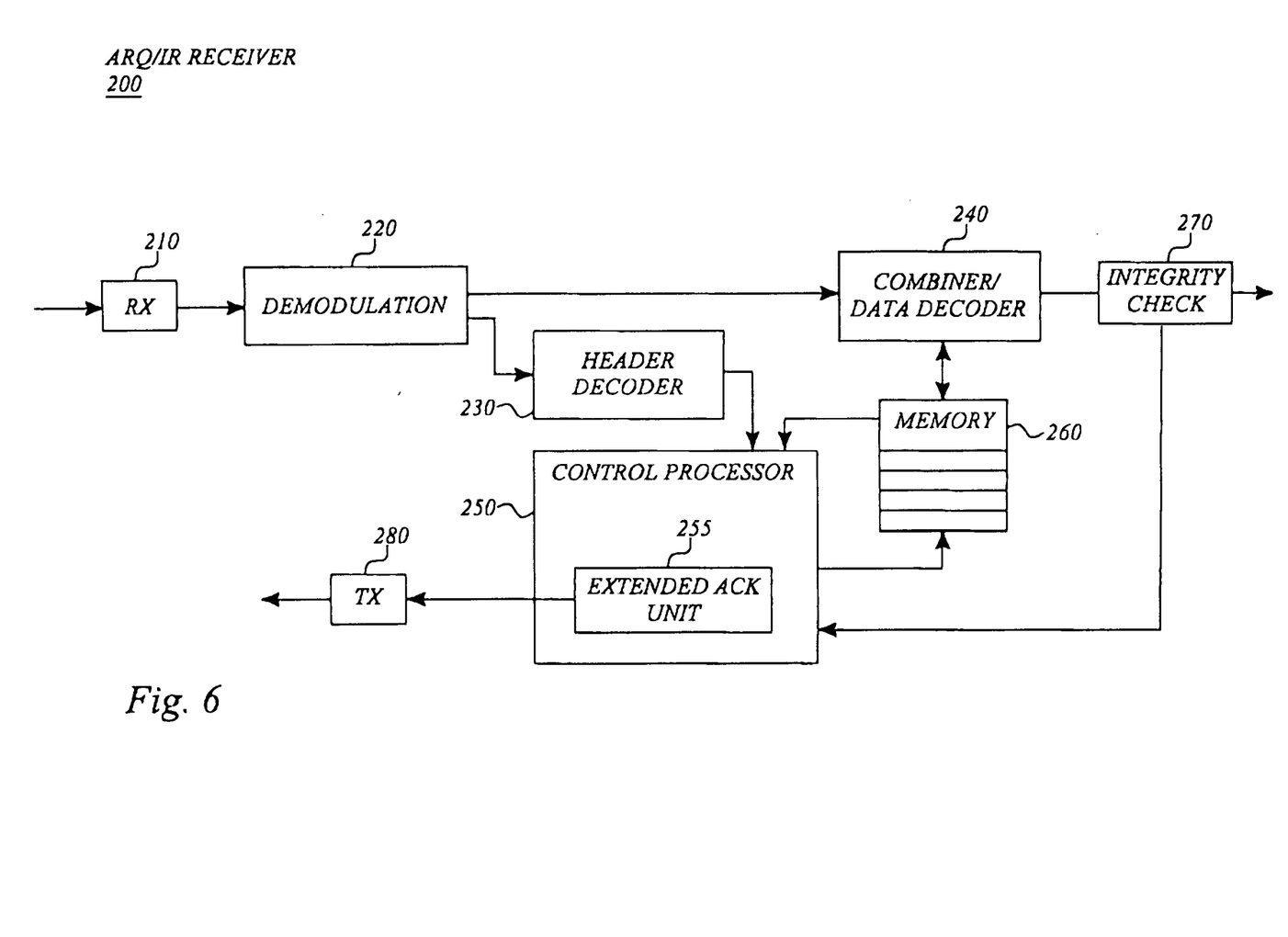
FIG. 6 is a schematic block diagram of an ARQ/IR receiver according to an exemplary embodiment of the invention.

FIG. 6 is a schematic block diagram of an ARQ/IR receiver according to an exemplary embodiment of the invention. The ARQ/IR receiver 200 basically comprises a receiver module 210, a demodulation module 220, a header decoder 230, a combiner/data decoder 240, a control processor 250, an incremental redundancy memory 260, a data integrity check module 270 and a transmission module 280. The encoded and modulated sub-blocks are received by the receiver module 210 and demodulated in demodulation module 220. The header information is decoded in the header decoder 230, and the header information including sequence number information is transferred to the control processor 250. The received and demodulated sub-blocks are forwarded to the combiner/decoder 240 for decoding. The decoding process may include soft combining of presently received bits with previously received soft bits associated with the same data block. For each received sub-block, the control processor 250 compares the corresponding sequence number with the sequence numbers of the sub-blocks held in memory 260. If there is a match, the control processor 250 transfers soft sub-block information corresponding to the same sequence number to the combiner/decoder 240, which combines the stored sub-block information with the received soft sub-block information, and then performs decoding operations. If the decoding is not successful, the receiver's IR memory 260 is updated with the received soft information and/or the combined information, preferably indexed with the corresponding sequence number and perhaps also sub-block number. If the decoding is successful, the data integrity of the data block is checked, e.g. by performing a CRC check, in the data integrity check module 270. If the CRC check is passed, the data is normally forwarded to higher layer functions on the receiving side. The control processor 250 is also informed of the result of the data integrity check. In this particular example, the control processor 250 includes an extended acknowledgement unit 255, which based on the result of the data integrity check and/or information on the situation in the receiver memory 260 with regard to the considered data block generates an appropriate extended acknowledgement feedback message for the data block. If the data block is successfully decoded, the acknowledgement feedback message will indicate this. Otherwise, the acknowledgement feedback message will somehow indicate whether any soft information associated with at least one sub-block of the data block is stored in the memory 260. The extended acknowledgement feedback message is transferred to the transmission module 280 for transmission to the transmitting side.

In a particular example, the transmitter 100 preferably operates based on a selective repeat (SR) ARQ scheme, with a windowing mechanism that allows a whole batch of packet data units to be sent to the receiver. The receiver 200 is then typically polled for feedback, and the receiver may then prepare and transmit an aggregated acknowledgement bitmap that includes extended acknowledgement information for each packet of the batch. When it can be expected that the bitmap will include a lot of ACK indications (00) and occasionally indicate other bit patterns, it may be useful to apply bitmap compression, for example using run-length encoding, to reduce the number of bits that have to be sent back to the transmitting side.

It has also been recognized that it is possible to provide an extended acknowledgement feedback that also enables indication of which of the multiple sub-blocks of a data block to set forth for transmission next. In a preferred embodiment, the receiving side then selects, for a given data block, a sub-block desired for transmission from the transmitting side and transmits an extended acknowledgement feedback message indicating that the receiving side wants the selected sub-block of the data block to be transmitted. The transmitting side transmits the selected sub-block to the receiving side in response to the extended acknowledgment feedback message when the corresponding data block is selected for retransmission.

For example, the selection of sub-block may be performed among those sub-blocks for which no soft information has been stored in the receiver memory to increase the likelihood of successful decoding of the corresponding data block. It is typically better to receive usable soft information from another sub-block not in the receiver memory rather than adding more soft energy to a packet already stored in memory. Assuming that soft values for sub-block P1 and P3 exist, but the receiver has no soft values for sub-block P2, it would then be better to retransmit sub-block P2 instead of upgrading the soft values of sub-block P1.

Alternatively or as a complement, the sub-block selection may be based on sub-block reception quality. For example, when all sub-blocks of a data block have been received but the data block can still not be successfully decoded, it may be useful to determine which of the sub-blocks to retransmit based on the reception quality of the sub-blocks. Typically, it would be best to retransmit the sub-block that has the lowest quality, i.e. the lowest level of soft energy in the receiver memory, since such a sub-block would probably benefit the most from a retransmission. As previously mentioned, the reception quality may for example be taken as any of the demodulation/decoding metrics available or determined based on explicit measurements of bit error rate, SNR, SIR or any combination thereof Anyway, this means that the receiver may tell the transmitter which sub-blocks that should preferably be sent, for example because they have not been received at all (e.g. due to a header error) or because they have been received with poor quality.

If each sub-block can be represented by several levels of soft energy in an extended acknowledgement feedback, it is also possible for the transmitter to decide which of the sub-blocks to set forth for retransmission based on the level information. The sub-blocks of a data block may a priori have substantially equal importance for decoding the data block. It may however be the case that some sub-blocks of a data block have significantly higher a priori importance for the decoding. In the latter case, it may be beneficial to consider both the sub-block reception quality and the a priori importance when selecting which sub-block to set forth for retransmission.

It may even be desirable to indicate priority among multiple sub-blocks, i.e. to indicate not only which sub-block that has top priority (preferred) from a reception quality point of view but also which sub-block that has second priority and so forth. The transmitter may then select which sub-block to set forth for transmission at least partly based on the indication of how sub-blocks are prioritized. This could be use full if a certain sub-block is easier for the transmitter to transmit than the preferred sub-block, for example because the former sub-block has already been produced and stored in cache for easy retrieval.

In a particularly preferred embodiment, the following convention is used before all sub-blocks have been received: In case of no header errors, the receiver follows an acknowledgement procedure in which the sub-blocks are requested in sequence if the preceding sub-block has been received and soft values are stored in the receiver memory. In case of a header error, the same sub-block will be requested again until soft values for that data block are stored in memory. If the previously presented extended bitmap for indicating how many sub-blocks that are represented in the receiver memory is used in the right way, benefits from both the data block selection feature and the sub-block selection feature can be obtained with a minimum of bits.

An example of a possible reporting sequence is given below:

10: Transmission of P2 is desired. Means that P1 is received without header error but not good enough to decode the RLC-block successfully.

10: Transmission of P2 is still desired. Means that it for some reason has not been possible to store soft values for P2 in the receiver memory, could be due to a header error or a full memory.

11: Transmission of P3 is desired. By help of the convention, this means that P2 now has soft values stored in the receiver memory.

10: Transmission of P1 desired again, which means that soft values for all three sub-blocks have been stored in memory. However, P1 has the lowest quality and therefore a retransmission of this packet is requested.

00: The RLC-block has now been correctly received and decoded.

In a further aspect of the invention, which can be separately applied, multiple extended acknowledgement feedback messages are aggregated in a single aggregated acknowledgement message or bitmap. This actually means that the receiving side transmits to the transmitting side an aggregated acknowledgment message for multiple data blocks at a time, enabling indication, for each data block, which sub-block of the data block to set forth for transmission to the receiving side. In particular, this opens up for more efficient use of incremental redundancy based on selective repeat ARQ. Preferably, bitmap compression may be applied to the aggregated acknowledgement bitmap to reduce the number of bits that have to be sent back to the transmitting side.

The invention is generally applicable to incremental redundancy schemes including Hybrid ARQ schemes. The invention has been found especially suitable for EGPRS (Enhanced General Packet Radio Service) applications, but can also be advantageously applied to other wireless standards such as W-CDMA, CDMA 2000, IEEE 802.16 (WiMax).

The embodiments described above are merely given as examples, and it should be understood that the present invention is not limited thereto. Further modifications, changes and improvements which retain the basic underlying principles disclosed and claimed herein are within the scope of the invention.

References

[1] International Patent Publication WO 02/23792 A1, Mar. 21, 2002.
[2] TSGR1#17(00)1382; Lucent Technologies; Nov. 21–24, 2000.
[3] TSGR1#18(01)0124 (Text Proposal for TR 25.848); Lucent Technologies; Jan. 15–19, 2001.
[4] RLC/MAC Simulation for GPRS and EDGE, P. Schefczik, *Global Wireless Systems Research*, Feb. 19, 1999.

The invention claimed is:

1. A method for incremental redundancy operation in a wireless communication network, wherein each of a number of data blocks is encoded with redundancy and reduced into at least one encoded version of the data block for transmission from a transmitting side to a receiving side, said method comprising the steps of:

extended acknowledgement feedback from the receiving side to the transmitting side for transfer of information, for each of a number of data blocks, representative of the level of reliability of information associated with at least one version of the data block received and stored in memory at the receiving side; and selecting at least one data block to retransmit based on extended acknowledgement feedback for a number of said data blocks by prioritizing those data blocks that have higher level of reliability of information in said memory.

2. The method according to claim 1, wherein said extended acknowledgement feedback is adapted for transfer of information, for each of a number of data blocks, representative of how many versions of the data block that have been represented in said memory, and prioritizing those data blocks that have more versions in memory.

3. The method according to claim 1, wherein said extended acknowledgement feedback also enables indication, for each of a number of data blocks, of which of the multiple versions of the data block to set forth for transmission next.

4. The method according to claim 1, further comprising the steps of:
the receiving side selecting, for a given data block, a version desired for transmission from the transmitting side;
transmitting an extended acknowledgement feedback message indicating that the receiving side wants the selected version of the data block to be transmitted; and
transmitting the selected version from the transmitting side to the receiving side in response to the extended acknowledgment feedback message when the corresponding data block is selected for retransmission.

5. The method according to claim 4, wherein said step of selecting a version of a data block comprises the step of selecting a version for which no soft information has been stored in said memory to increase the likelihood of successful decoding of the corresponding data block.

6. The method according to claim 4, wherein said step of selecting a version of a data block is based on data block version reception quality.

7. The method according to claim 6, wherein said step of selecting a version of a data block comprises the step of determining, when all versions of a data block have been received but the data block can still not be successfully decoded, which of the versions to retransmit based on the reception quality of the versions.

8. The method according to claim 1, wherein said extended acknowledgement feedback is implemented by transmitting, for each of a number of data blocks, an extended acknowledgment message comprising at least two bits representing the status of the data block at the receiving side.

9. The method according to claim 8, wherein said extended acknowledgement message has multiple potential bit patterns, a unique bit pattern being assigned to represent the situation when no version of a given data block has been stored in memory at the receiving side, another bit pattern being assigned to represent the situation when one version of a given data block has been stored in memory at the receiving side, and yet another bit pattern being assigned to represent the situation when two versions of a given data block have been stored in memory.

10. The method according to claim 9, wherein said extended acknowledgement message has a further potential bit pattern indicating that an entire data block has been correctly received and decoded.

11. The method according to claim 8, further comprising the step of aggregating multiple extended acknowledgement messages into a single aggregated acknowledgement bitmap.

12. The method according to claim 11, further comprising the step of applying bitmap compression to the aggregated acknowledgment bitmap.

13. The method according to claim 1, wherein the versions of a data block a priori have substantially equal importance for decoding the data block.

14. A system for incremental redundancy operation in a wireless communication network, wherein each of a number of data blocks is encoded with redundancy and reduced into at least one encoded version for transmission from a transmitting side to a receiving side, said system comprising:
means for extended acknowledgement feedback from the receiving side to the transmitting side for transfer of information, for each of a number of data blocks, representative of the level of reliability of information associated with at least one version of the data block received and stored in memory at the receiving side; and
means for selecting at least one data block to retransmit based on extended acknowledgement feedback for a number of said data blocks by prioritizing those data blocks that have higher level of reliability of information in said memory.

15. The system according to claim 14, wherein said means for extended acknowledgement feedback is adapted for transfer of information, for each of a number of data blocks, representative of how many versions of the data block that have been represented in said memory, and said means for selecting is operable for prioritizing those data blocks that have more versions in memory.

16. The system according to claim 14, wherein said means for extended acknowledgement feedback is configured to also enable indication of which of the multiple versions of a data block to set forth for transmission next.

17. The system according to claim 16, further comprising:
means, provided at the receiving side, for selecting a version desired for transmission from the transmitting side;
means for transmitting an extended acknowledgement feedback message indicating that the receiving side wants the selected version of the data block to be transmitted; and
means for transmitting the selected version from the transmitting side to the receiving side in response to the extended acknowledgment feedback message when the corresponding data block is selected for retransmission.

18. The system according to claim 17, wherein said means for selecting a version of a data block is configured for selecting a version for which no soft information has been stored in memory to increase the likelihood of successful decoding of the corresponding data block.

19. The system according to claim 17, wherein said means for selecting a version of a data block operates based on data block version reception quality.

20. The system according to claim 19, wherein said means for selecting a version of a data block comprises means for determining, when all versions of a data block have been received but the data block can still not be successfully decoded, which of the versions to retransmit based on the reception quality of the versions.

21. The system according to claim 14, wherein said means for extended acknowledgement feedback comprises means for transmitting, for each of a number of data blocks, an extended acknowledgment message comprising at least two bits representing the status of the data block at the receiving side.

22. The system according to claim 21, wherein said extended acknowledgement message has multiple potential bit patterns, a unique bit pattern being assigned to represent the situation when no version of a given data block has been stored in memory at the receiving side, another bit pattern being assigned to represent the situation when one version of a given data block has been stored in memory at the receiving side, and yet another bit pattern being assigned to represent the situation when two versions of a given data block have been stored in memory.

23. The system according to claim 22, wherein said extended acknowledgement message has a further potential bit pattern indicating that an entire data block has been correctly received and decoded.

24. The system according to claim 21, wherein said means for extended acknowledgement feedback comprises means for aggregating multiple extended acknowledgement messages into a single aggregated acknowledgement bitmap.

25. The system according to claim 24, further comprising means for applying bitmap compression to said aggregated acknowledgement bitmap.

26. The system according to claim 14, wherein the versions of a data block a priori have substantially equal importance for decoding the data block.

27. A receiving node for incremental redundancy operation in a wireless communication network, said receiving node comprising:
means for receiving encoded versions of data blocks to decode, if possible, at least one data block, each data block initially being encoded with redundancy and reduced into at least one encoded version; and
means for extended acknowledgement feedback to the transmitting side for transfer of information, for each of a number of data blocks, representative of the level of reliability of information associated with at least one version of the data block received and stored in memory in said receiving node;
thereby supporting selection of which of said data blocks to retransmit based on prioritization of those data blocks that have higher level of reliability of information in said memory.

28. The receiving node according to claim 27, wherein said means for extended acknowledgement feedback is adapted for transfer of information, for each of a number of data blocks, representative of how many versions of the data block that have been represented in said memory.

29. The receiving node according to claim 27, wherein said means for extended acknowledgement feedback is configured to also enable indication of which of the multiple versions of a data block to set forth for transmission next.

30. The receiving node according to claim 29, further comprising:
means, provided at the receiving side, for selecting a version desired for transmission from the transmitting side; and
means for transmitting an extended acknowledgement feedback message indicating that the receiving side wants the selected version to be transmitted if the corresponding data block is selected for retransmission.

31. The receiving node according to claim 30, wherein said means for selecting a version of a data block is configured for selecting a version for which no soft information has been stored in memory to increase the likelihood of successful decoding of the corresponding data block.

32. The receiving node according to claim 30, wherein said means for selecting a version of a data block operates based on data block version reception quality.

33. The receiving node according to claim 32, wherein said means for selecting a version of a data block comprises means for determining, when all versions of a data block have been received but the data block can still not be successfully decoded, which of the versions to retransmit based on the reception quality of the versions.

34. The receiving node according to claim 27, wherein said means for extended acknowledgement feedback comprises means for transmitting, for each of a number of data blocks, an extended acknowledgment message comprising at least two bits representing the status of the data block at the receiving side.

35. The receiving node according to claim 34, wherein said means for extended acknowledgement feedback comprises means for aggregating multiple extended acknowledgement messages into a single aggregated acknowledgement bitmap.

36. The receiving node according to claim 35, further comprising means for applying bitmap compression to said aggregated acknowledgement bitmap.

37. A transmitting node for incremental redundancy operation in a wireless communication network, said transmitting node comprising:
means for encoding each of a number of data blocks with redundancy and reducing each encoded data block into at least one encoded version;
means for transmitting said encoded versions to the receiving side;
means for receiving extended acknowledgement feedback from the receiving side indicating, for each of a number of said data blocks, the level of reliability of information associated with at least one version of the data block received and stored in memory at the receiving side; and
means for selecting at least one data block to retransmit to the receiving side based on extended acknowledgement feedback for a number of said data blocks by prioritizing those data blocks that have higher level of reliability of information in said memory.

38. The transmitting node according to claim 37, wherein said extended acknowledgement feedback indicates, for each of a number of said data blocks, how many versions of the data block that have been represented in said memory, and said means for selecting is operable for prioritizing those data blocks that have more versions in said memory.

* * * * *

UNITED STATES PATENT AND TRADEMARK OFFICE
CERTIFICATE OF CORRECTION

| | |
|---|---|
| PATENT NO. | : 7,225,382 B2 |
| APPLICATION NO. | : 10/837753 |
| DATED | : May 29, 2007 |
| INVENTOR(S) | : Ramesh et al. |

It is certified that error appears in the above-identified patent and that said Letters Patent is hereby corrected as shown below:

Title Page, Item (75) Inventors: "Ramech" should read --Ramesh--.

Signed and Sealed this

Twenty-first Day of August, 2007

JON W. DUDAS
*Director of the United States Patent and Trademark Office*